Sept. 2, 1969  H. B. JANSEN  3,464,474
FASTENER WITH SPRING BIASED LOCK
Filed Jan. 29, 1968  2 Sheets-Sheet 1

INVENTOR.
HARRY B. JANSEN
BY

Sept. 2, 1969    H. B. JANSEN    3,464,474

FASTENER WITH SPRING BIASED LOCK

Filed Jan. 29, 1968    2 Sheets-Sheet 2

INVENTOR.
HARRY B. JANSEN
BY Roger A. Marrs

United States Patent Office 3,464,474
Patented Sept. 2, 1969

3,464,474
FASTENER WITH SPRING BIASED LOCK
Harry B. Jansen, 1641 Fernbrook Place,
Glendale, Calif. 91208
Filed Jan. 29, 1968, Ser. No. 701,407
Int. Cl. F16b *39/04, 39/00*
U.S. Cl. 151—24   6 Claims

ABSTRACT OF THE DISCLOSURE

A self-locking fastener is disclosed herein for preventing accidental disengagement from a workpiece. The fastener includes a bolt having a pin or key receiving means disposed upon its threaded shank which is adapted to threadably engage a collared nut. Locking means, carried by the collared nut, are urged, via biasing means, into engagement with the pin or key receiving means, thereby preventing rotation of the nut upon the bolt.

BACKGROUND OF THE INVENTION

Field of the invention

This invention relates generally to fasteners and, more particularly, to a self-locking fastener which cannot be accidentally dislodged or removed from a workpiece.

Description of the prior art

Heretofore, a great number of devices have been proposed which are in the category of fasteners that cannot be accidentally removed or dislodged from a workpiece. It has been found that many of these known prior art fasteners operate with safety features which have disadvantages, making them difficult to use, and they possess a high degree of complexity overshadowing their advantages. In addition, many prior art fasteners have such a complex structure that their cost is extremely high or they comprise such a multitude of parts making up their mechanisms that the optimum strength of the fastener is markedly cut down to the point where use becomes impractical.

One popular and economical type of prior art fastener comprises a cotter pin inserted through a bolt to prevent accidental dislodging of an engaged nut. While possessing many advantages, cotter pins are easily forgotten, or worn and reused, with the result that disengagement may occur, particularly under shock and vibration conditions. As a consequence, the development and usage of colored, or color-coded, cotter pins has been recommended by certain safety agencies, such as the United States Naval Aviation Safety Center, to alleviate or help detect omissions and thereby reduce the number of disconnects. While such a device acts as a reminder, it still does not insure that the workpiece will be adequately secured.

For this reason, many fasteners of the prior art often have apparatus which prevent the fastener's removal, even though a retaining nut or other holding force has been removed. However, this self-same apparatus may be actuated accidentally through vibration or by application of an axial load to the fastener. Certain other varieties of prior art fasteners have relied on friction for their safety feature and are, therefore, not fool-proof or positive in their holding ability. Still other prior art fasteners have a disadvantage in that the locking element is not visible when installed and, accordingly, it is not entirely known to the mechanic installing the same if installation is proper. The procedures for installing these latter fasteners must be followed precisely and even though the procedure is followed, it is very difficult or impossible to inspect the assembled structure.

Because of the aforementioned disadvantages of the prior art, many civilian and military agencies have recommended that backup devices be used, since installation is generally made by people of varying skills and knowledge and often under conditions which are conducive to human error. While many of these backup devices, such as high visibility cotter pins, are inexpensive, they still require additional work and time for their installation and removal and are thus likely to be forgotten or dispensed with by the person installing the same.

SUMMARY OF THE INVENTION

The disadvantages of the aforementioned prior art fasteners have been eliminated by the fastener disclosed herein, which can be operated in such a manner that it is foolproof and automatic in installation and removal.

The fastener comprises a bolt having a pin or key receiving means disposed adjacent its threaded end. A nut having a collar portion is adapted to threadably engage the bolt, the collar carrying a biased locking pin or key which engages the pin or key receiving means.

In one embodiment, the collar is split, thereby acting as a keyway for a spring biased locking ring and key carried by the nut. The spring urges the key into engagement with the key receiving means of the bolt, thereby preventing rotation of the nut. The lock ring is characterized by a cam surface which, upon insertion of a wrench thereover, causes the locking ring to move against the force of the spring, thereby disengaging the locking ring key from the bolt.

In the other embodiment, the locking means includes a spring carrying locking cap having a cam surface adjacent a portion of its periphery and removably mounted to the collared nut. The internal surface of the collar is splined and engages an externally splined section of the locking cap so as to selectively prevent rotation of the cap upon the nut. The spring carried by the locking cap includes a locking pin which is adapted to be inserted into the pin receiving means within the bolt. When the nut is desired to be threadably engaged upon, or disengaged from, the bolt, a standard hexagonal socket wrench is pressed over the nut and against the cam surface, causing the locking ring to be moved against and overcomes the biasing effect of the spring. When the socket wrench is removed, the spring again biases the pin back into engagement within the bolt, thereby preventing rotation of the nut upon the bolt.

It is, therefore, an object of the present invention to provide an automatically self-locking fastener.

Another object of the present invention is to provide a self-locking fastener which is automatically unlocked by placement of a socket wrench over the locking nut.

Another object of the present invention is to provide a self-locking fastener which may be locked in any of a variety of selected positions.

Another object of the present invention is to provide a self-locking fastener which includes a nut carried biased locking means.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

3

Figure 3:
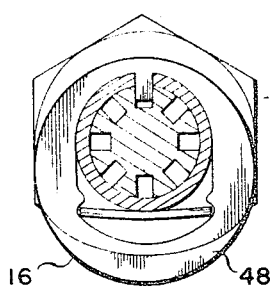
FIGURE 3 is a view taken along lines 3—3 of FIG-
Figure 4:
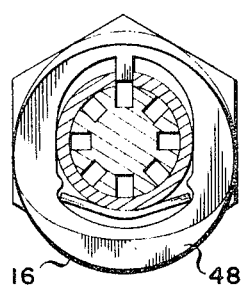
Figure 5:
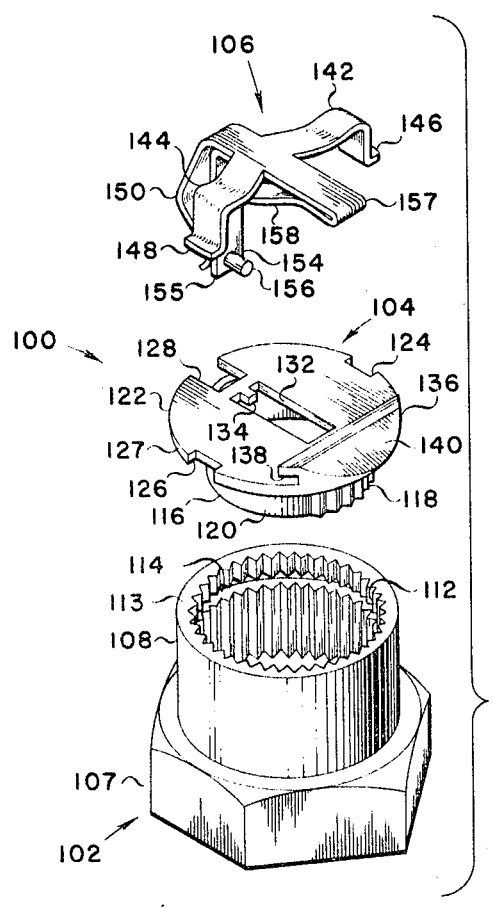
Figure 7:
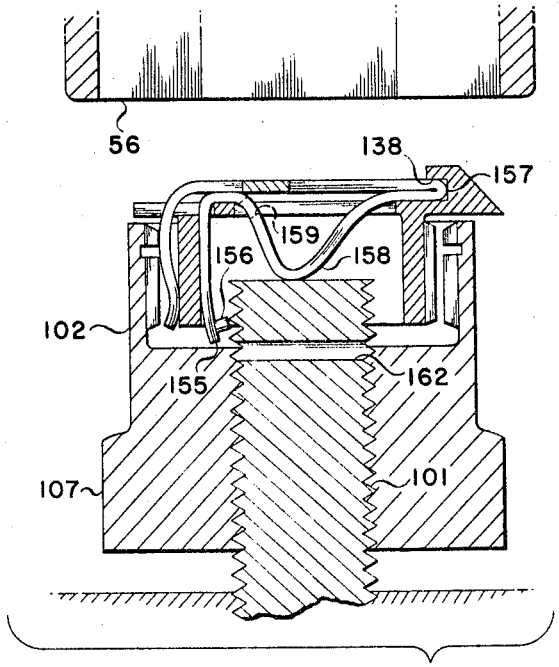
Figure 6:
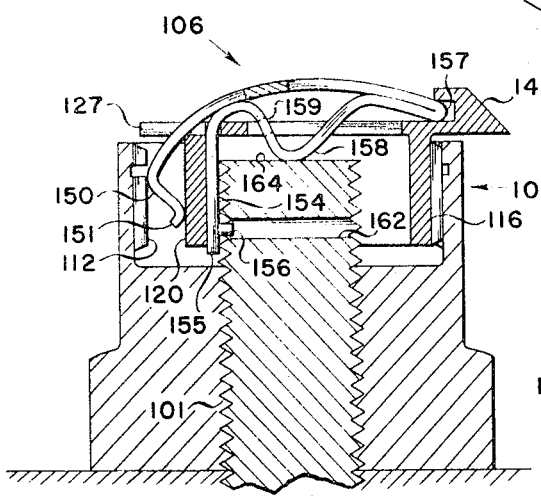
Figure 8:
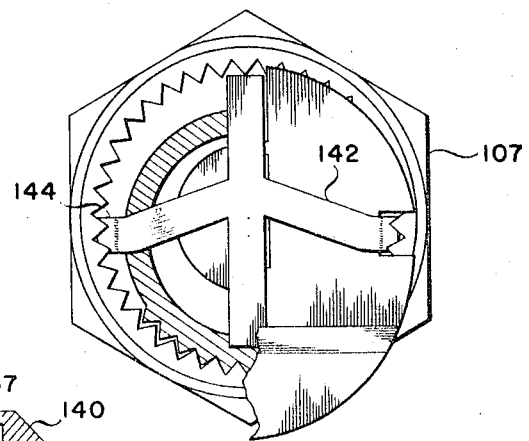

URE 2 and illustrating the fastener in the locked position;

FIGURE 4 is similar to FIGURE 3, illustrating the fastener in the unlocked position;

FIGURE 5 is an exploded perspective view of another embodiment of the present invention;

FIGURE 6 is a side elevation of the assembled fastener of FIGURE 5, partially in section to illustrate engagement of the parts, the fastener being in the locked position;

FIGURE 7 is similar to FIGURE 6, the fastener being illustrated in the unlocked position; and FIGURE 8 is a plan view of the fastener, partially broken away to show structural detail.

DESCRIPTION OF THE PREFERRED EMBODIMENTS

Referring to the drawings and, more particularly to FIGURES 1–4 thereof, there is generally indicated by the numeral 10 a fastener constructed in accordance with the present invention, which is used in combination with a workpiece 11 having an aperture 12 extending therethrough.

The fastener 10 comprises a bolt 13, nut 14, locking ring 16, spring 18 and retainer 20.

The bolt 13 includes a conventional head 22 and a shank 24 which is characterized by longitudinal channels 26 extending from its end 28 to a preselected distance along the shank 24. The bolt 13 is partially threaded, the threads being disposed adjacent the channels 26. While a plurality of channels 26 is illustrated, it is to be understood that any desired number may be used, depending in part upon the bolt strength required.

The nut 14 includes a conventional hexagonal head 32 and a split collar 34 defining a keyway 36 throughout its length. The interior surface 37 of the collar 34 and the head 32 are threaded in registering relationship such that the nut 14 and collar 34 will threadably engage the threaded shank 24 of the bolt 13. The collar 34 is further characterized by a reduced diameter section 38 terminating at a shoulder 39 which is disposed adjacent its end opposite the head 32.

Figure 1:
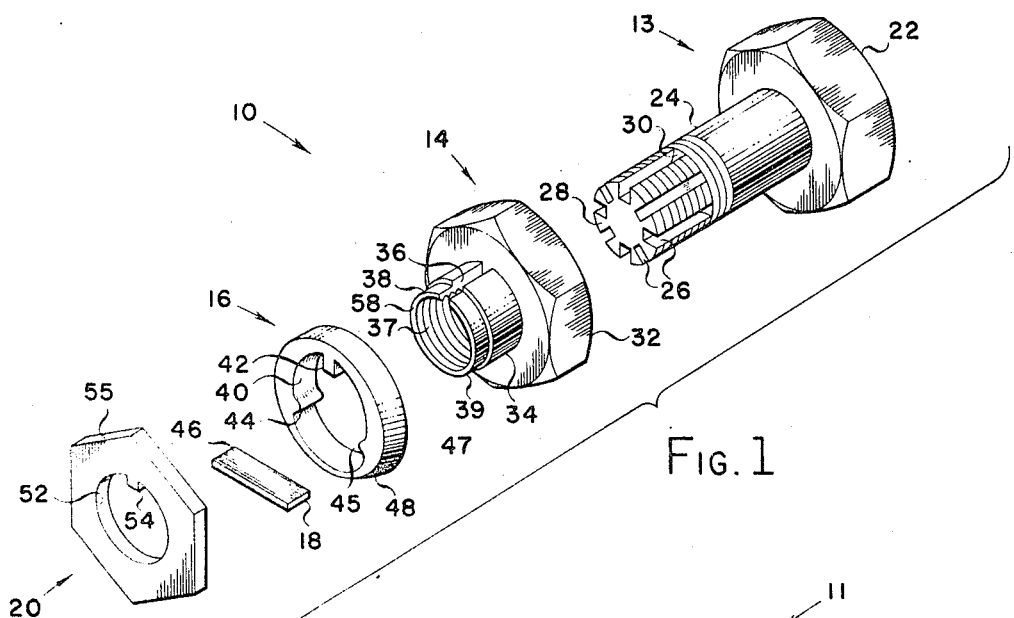
FIGURE 1 is an exploded perspective view of the fastener of the present invention.
Figure 2:
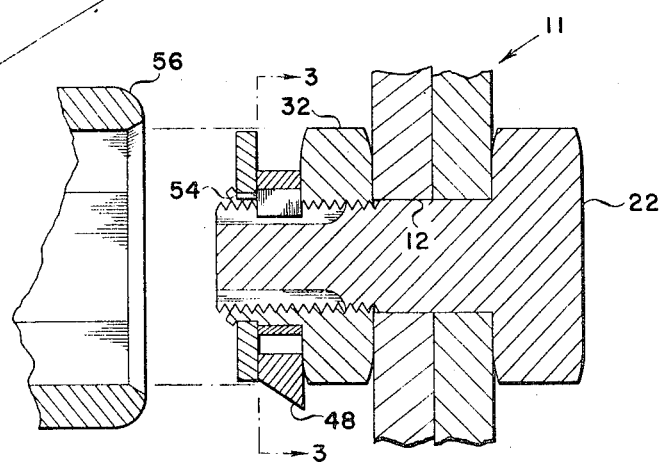
FIGURE 2 is a side elevation of the assembled fastener of FIGURE 1 partially in section to illustrate the engagement of the parts.

The lock ring 16 is carried by the nut 14 and includes an inner surface 40 which is adapted to be received and slidably retained by the nut 14 via a key 42. The key 42 depends inwardly from the surface 40 and is slidably positionable within the keyway 36 of the nut 14. As best illustrated in FIGURES 1, 3 and 4, the interior surface 40 of ring 16 defines a modified FIGURE 8 shape, such that when the locking ring 16 is inserted over the collar 34 and is adjacent the head 32, the collar 34 occupies the upper portion of the FIGURE 8 and nests upon shoulders 44 and 45. The lower portion of the ring 16 is adapted to receive and carry the spring 18, which is substantially V-shaped after insertion and is disposed intermediate and against the underside of the shoulders 44 and 45. When assembled, surface 46 of the spring 18 is tangent to the collar 34 and biases the key 42 into the keyway 36. The ring 16 is further chracterized by an outer surface 47 having a cam section 48 disposed opposite the key 42, the purpose and operation of which is to be more fully described hereinafter.

The retainer 20 defines an aperture 52 therethrough and a key 54 is adapted to be received by and fixedly secured to the reduced diameter section 38 against the shoulder 39. The retainer 20 includes a hexagonal outer surface 55 which is in aligned relationship with the head 32 such that when a socket wrench 56 is disposed over the retainer 20, it will also be in alignment with the nut 14.

The fastener 10 is then assembled in the following manner. Spring 18 is inserted within the lower portion of the lock ring 16 and the lock ring 16 is slidably positioned over the collar 34 by alignment and disposition of the key 42 within the keyway 36. Retainer 20 is thereupon

4 secured to the collar 34 by any suitable conventional means, such as by the stacking of end 58.

In operation then the fastener 10 works in the following manner. As socket wrench 56 is inserted over the retainer 20, it makes contact with the cam surface 48 of the lock ring 16, whereupon it urges the lock ring 16 to move from the position illustrated in FIGURE 3 to the position illustrated in FIGURE 4 against the urging of the spring 18. As the lock ring 16 moves, key 42 is displaced from one of the slots 26. The nut 14 is thereupon free to rotate with respect to the bolt 13 and may be disengaged.

Conversely, when the nut 14 is desired to be threadably engaged upon the bolt 13, the nut 14 may be rotated until the key 42 contacts the end 28 of the bolt 13 thereby stopping further progressive movement. The wrench 56 may then be inserted over the assembly depressing the lock ring 16 against the urging of the spring 18 until the bolt 13 is free to progress further within the nut 32 and collar 34.

Referring now to FIGURES 5–8, a modified embodiment of the present fastener is generally indicated by the numeral 100. The fastener 100 includes a threaded bolt 101, a nut 102, locking cap 104 and spring 106.

The nut 102 includes a conventional head 107 adapted to receive and be engaged by a standard hexagonal socket wrench 56. The nut 102 comprises a collar 108, which is characterized by an inner splined surface 112 extending around its inner periphery and from surface 113 to the head 107. The inner surface 112 defines a race 114 extending completely therearound in concentric relationship with the surface 113, the function of which will be more fully described hereinafter.

The locking cap 104 comprises a collar 116 having a splined section 118 disposed upon a section of its outer surface 120 and a cap 122. The diameter of the collar 116 is substantially less than the diameter of the collar 108 for the purpose to be hereinafter described. The cap 122 defines grooves 124 and 126 upon its circumferential surface 127, as well as a groove 128. The grooves 124 and 126 are disposed in opposing relation to one another, but do not extend interiorly of the collar 116. The groove 128 is disposed substantially intermediate the grooves 124 and 126 and extends interiorly of the collar 116, such that a passage or channel is defined thereby.

The cap 122 is further characterized by an aperture 132 which is substantially rectangular in shape and in aligned relation with the groove 128. Aperture 132 is positioned such that when the cap 122 is carried by the nut 102, the aperture 132 is disposed over the interior portion of the collar 116. A key 134 located at one end of the aperture 132 is adjacent the groove 128 and is directed away therefrom.

A retainer flange 136 is disposed upon the cap 122 adjacent and above the splined section 118 and defines a retainer groove 138 disposed in receiving relation towards the key 134. The flange 136 is characterized by a cam surface 140 which slopes outwardly and downwardly from the central portion of the collar 116 towards the circumferential surface 127, thereby forming a lip. When the locking cap 104 is carried by and engaged upon the collar 108, the cam surface 140 will extend beyond the surface 113 as best illustrated by FIGURES 6–8.

Referring now more particularly to the spring 106, it is illustrated as comprising two wings 142 and 144, having flanges 146 and 148 respectively. The forward portion of the spring 106 is shaped in the form of a bullnose 150, the terminating end 151 of which bears against and depends away from the surface 120. A leg 154 formed by the spring 106 extends substantially downwardly and has disposed adjacent its end 155 a pin 156. Intermediate the leg 154 and end 157 the spring 106 is further characterized by a second bullnose 158 which depends downwardly near its middle.

An aperture 159 adjacent and forward the bullnose 158 is adapted to receive and retain the key 134 so as to be fixedly positioned thereby.

In operation then, the novel fastener 100 is assembled and works in the following manner.

When the spring 106 engages the cap 104, end 157 is inserted within the retainer groove 138. The bullnose 150 is disposed intermediate the surface 120 and the splined surface 112 while the leg 154 is positioned intermediate the interior of the collar 116 and the bolt 101 via the groove 128. The wings 142 and 144 are adapted such that they are thereupon located within the grooves 124 and 126 respectively, and their flanges 146 and 148 movably engage the race 114. Upon being engaged in the aforedescribed manner, the key 134 is inserted within the aperture 159, thereby completely securing the spring 106 with respect to the cap 104.

As best illustrated in the FIGURES 6–8, the cap 104 upon being inserted into the collar 116 engages the inner splined surface 112 via the splined section 118. The bullnose 150 bears against the inner splined surface 112 so as to force the splined sections into engagement with each other.

When a standard socket wrench 56 is disposed over the spring 106 and locking cap 104, it bears against the cam surface 140 forcing it from the position of FIGURE 6 to that of FIGURE 7 against the biasing effect of the bullnose 150.

As the force of the spring 106 is overcome, pin 156 is dislodged from channel 162 disposed through the bolt 101, allowing the fastener 100 to be unthreaded. Conversely, when the fastener 100 is threadably engaged upon the bolt 101, it will advance until the pin 156 engages the channel 162 thereby stopping rotation of the nut 102 with respect to the bolt 160.

It is to be noted that at the time of this engagement, end 164 of the bolt 101 bears against the bullnose 158 causing the spring 106 to bulge, as best illustrated in FIGURE 6. Depression of the spring 106 by insertion of the wrench 56, in conjunction with movement of the cap 104, causes the pin 156 to become disengaged from the channel 162, thereby releasing the nut 102 from the bolt 101 and allowing it to freely turn. Until that time the biasing effect of the bullnose 150 against the splined surface 112 will keep the splined section 118 in engagement with the surface 112.

While particular embodiments of the present invention have been shown in described, it will be obvious to those skilled in the art that changes and modifications may be made.

What is claimed is:

1. A fastener comprising: a bolt having a threaded shank provided with at least one channel; a collared nut adapted to threadably engage said bolt, said nut having a head with an outer polygonal surface and the collar of said nut having an opening therethrough providing access to said channel; a lock ring provided with an aperture adapted to be received over said collar, said lock ring having a key extending into said aperture and adapted to be received in said channel through said opening, spring means to bias said key into said opening and channel, and an outer cam surface extending, when said key is biased into said channel, beyond said outer polygonal surface of said nut; and a retainer adapted to be received over said collar and having an outer surface with the same polygonal shape as said outer surface of the head of said nut, whereby a polygonal wrench may be guided by said retainer over said outer polygonal surface of said head of said nut and engage said cam surface to move said lock ring against said bias and lift said key from said channel.

2. A fastener as defined in claim 1, wherein said collar of said nut has a reduced diameter portion adjacent the end of the collar opposite the head forming a shoulder on said collar and said retainer is received on said reduced diameter portion and secured thereon against said shoulder to retain said lock ring on said collar.

3. A fastener as recited in claim 1, wherein said retainer has a key adapted to be received in said opening whereby said outer surface of said retainer is aligned with said outer surface of the head of said nut.

4. A fastener as recited in claim 1, wherein said spring means extends across the aperture of said lock ring and is adapted to engage said collar at a point opposite said keyway.

5. A fastener as recited in claim 1, wherein said lock ring comprises a pair of shoulders extending into said aperture and said spring means comprises a flat spring extending between said shoulders.

6. A fastener as recited in claim 1, wherein said channel extends longitudinally to the free end of said bolt and said opening extends longitudinally of said collar to the free end of said collar.

References Cited

UNITED STATES PATENTS

| 613,035 | 10/1898 | Hannaford | 151—6 |
| 647,435 | 4/1900 | Bean | 151—6 |
| 1,187,713 | 6/1916 | Cline | 151—6 |
| 1,191,955 | 7/1916 | Ellison | 151—6 |
| 1,235,864 | 8/1917 | Whaley | 151—12 |

FOREIGN PATENTS

| 696,434 | 10/1930 | France. |
| 562,445 | 7/1944 | Great Britain. |
| 260,317 | 9/1928 | Italy. |
| 351,455 | 2/1961 | Switzerland. |

OTHER REFERENCES

Ser. No. 411,076, Jacob (A.P.C.), published in May 1943.

MARION PARSONS, Jr., Primary Examiner

U.S. Cl. X.R.

151—6, 28